Patented Nov. 13, 1951

2,575,179

UNITED STATES PATENT OFFICE 2,575,179

WATER TREATING COMPOSITIONS

John W. Lefforge, Anniston, Ala., assignor to Monsanto Chemical Company, St. Louis, Mo., a corporation of Delaware No Drawing. Application December 15, 1947, Serial No. 791,936

8 Claims. (Cl. 252—175)

The present invention relates to improved water treating compositions and to an economically and commercially feasible method of preparing same.

One object of the invention is to provide a water treating composition of improved solution rate which contains a water soluble molecularly dehydrated alkali metal phosphate having a molecular ratio of alkali metal oxide to $P_2O_5$ of about 1.0 to about 1.3, a compound or compounds which liberate a relatively water insoluble gas when contacted with water and a wetting rate retarder comprising an unsaturated aliphatic hydrocarbon compound containing in the hydrocarbon radical from 6 to 12 carbon atoms per polar group, or more particularly an unsaturated aliphatic hydrocarbon containing from 6 to 12 carbon atoms for each double bond in the aliphatic chain.

Another object of the invention is to provide a water treating composition of substantially increased solution rate which contains a water soluble molecularly dehydrated sodium phosphate having a $Na_2O/P_2O_5$ molecular ratio of from 1.0 to 1.3, an alkalinity adjusting agent which liberates a substantially water insoluble gas upon reaction with the above phosphate and a hydrocarbon compound of the above type, which composition floats upon the surface of the water treated therewith until dissolved, or at least partially sinks toward the bottom of the dissolving vat and then is refloated by the buoying action of the liberated gas until completely dissolved.

A further object is to provide a water treating composition including the above combination of ingredients, which disintegrates and spreads over the surfaces of the water treated and thus provides a non-matting or non-lumping material which possesses a substantially improved solution rate over that of similar compositions not containing a wetting rate retarder.

Other objects and advantages of the present invention will be apparent to those skilled in the art as the description proceeds.

Water soluble sodium metaphosphate is a well known and widely used water treating compound which is available commercially in the form of a glass, powder or flakes, but for various reasons hereinafter indicated, these products have not been entirely satisfactory.

For example, sodium hexametaphosphate in the form of broken glass is not convenient to handle and in addition is very slowly soluble. The flaked material readily goes into solution but is expensive to produce and has the objectionable property of sticking to or cutting the hands of the user. The powdered product mats up or lumps when added to water and settles to the bottom of the dissolving vat in the form of a sticky gummy mass which dissolves at an extremely slow rate.

The matting tendency of powdered sodium hexametaphosphate may be counteracted partially by mixing therewith sodium carbonates and other gas liberating alkalinity adjusting agents, but this method or approach does not provide a satisfactory solution to the problem. For example, if such mixtures are added to water, matting or lumping does not take place to the extent that it occurs with powdered sodium hexametaphosphate per se, but the wetting rate of the phosphate powder and the gas liberation rate are so rapid that the buoying action of the gas is not of sufficient duration to insure complete solution of the mixture. The result is that appreciable amounts of sodium hexametaphosphate sink to the bottom of the dissolving vat and form a phosphate residue which dissolves very slowly.

Heretofore, it has been proposed to solve the above problem by agglomerating mixtures of powdered sodium hexametaphosphate and sodium carbonates. This method achieved some measure of success but is subject to the disadvantage of being expensive and of causing an excessive amount of reversion which seriously impairs the water softening properties of the product.

I have made the surprising discovery that if finely divided sodium hexametaphosphate, sodium carbonate and an aliphatic hydrocarbon compound of the above type are homogeneously blended together in the proportions hereinafter indicated, a water treating product of substantially improved solution rate is provided which has none of the objectionable properties mentioned above. Thus, the resulting composition is in a very convenient form to handle, that is, to take out of the container, measure and put into solution; it is also quickly soluble and does not mat up when introduced into water; and it can be very easily and economically produced on a commercial scale.

The sodium carbonate in the above composition serves as an alkalinity adjusting agent and also as a means of developing carbon dioxide which causes the product to float on the surface of the water. Thus, sodium carbonate liberates carbon dioxide by reaction with sodium hexametaphosphate and the liberated gas forms bubbles which attach themselves to the particles of the phosphate product. These bubbles buoy up the particles and cause the latter to float on the surface of the water until completely dissolved.

The aliphatic hydrocarbon compounds of the present invention are somewhat repellent and retard the wetting rate of the sodium hexametaphosphate particles and this has the desirable effect of causing the bubbles produced by the liberated carbon dioxide to attach themselves to the above particles with the result that the latter are buoyed up and floated on the surface of the water. The wetting rate retarding action of the unsaturated hydrocarbon compounds brings about a slower but more uniform reaction between the phosphate particles and the sodium carbonate and therefore the liberated gas is able to float the particles upon the surface of the water for a period long enough to effect complete solution. These compounds also disperse any floating lumps of the mixture which form on the surface and thus not only aid in the prevention of matting but also increase the surface of the particles exposed to the dissolving action of the water treated.

The problems of matting and slow solution rate are not restricted to sodium hexametaphosphate as they are encountered in all of the water soluble molecularly dehydrated alkali metal phosphates having an alkali metal oxide/$P_2O_5$ molecular ratio of from about 1.0 to about 1.3 and it is to be understood that the present invention is directed to all of the foregoing phosphates and particularly to the sodium and potassium phosphates within the above range.

For a more complete understanding of the present invention reference is made to the following examples which demonstrate the marked increase in solution rate obtained by incorporating an unsaturated hydrocarbon compound of the type hereinbefore indicated with mixtures of sodium carbonate and water soluble molecularly dehydrated sodium phosphates having a $Na_2O/P_2O_5$ molecular ratio within the range of from 1.0 to 1.3.

Example I

A finely divided phosphate product (Calgon) composed of approximately 80.8% by weight of sodium hexametaphosphate, 11.8% by weight of tetrasodium pyrophosphate and 7.4% by weight of sodium acid pyrophosphate was thoroughly mixed with 6% by weight of sodium carbonate to form a substantially homogeneous mixture of these materials. A 5-gram sample of the product was added to a beaker containing a liter of water and the time required to completely dissolve this material without agitation was determined. It was found that a substantial proportion of the sample rapidly dissolved during the gas liberating stage, but as soon as this was over, a portion thereof sank to the bottom of the beaker and formed a phosphate residue which dissolved so slowly that a total of 11 minutes was required for complete solution.

A similar mixture was prepared except that 1% by weight of "propylene polymer" was uniformly blended therewith.

A 5-gram sample of this product was introduced into a liter of water and its solution rate determined in the manner described above. It was found that instead of setting free carbon dioxide all at once and leaving a slowly dissolving residue on the bottom of the beaker, the hydrocarbon caused the phosphate material to spread out on the surface of the water and liberate the above gas slowly and uniformly with the result that the product floated and dissolved completely within a period of 6.5 minutes.

Example II

A finely divided phosphate composition consisting essentially of sodium septaphosphate ($Na_9P_7O_{22}$) was thoroughly mixed with 6% by weight of sodium carbonate and a 5-gram sample of the resulting product was added to a liter of water for the purpose of determining its solution rate. As in Example I a substantial amount of the product rapidly dissolved during the gas liberation period, but a slowly dissolving residue was formed on the bottom of the beaker and it required 16 minutes to achieve complete solution of the entire sample.

The above experiment was repeated using the same composition to which 1% by weight of "propylene polymer" had been added and intimately mixed. The resulting product dissolved completely without agitation in a period of 5 minutes.

The above examples show that the problem of matting or lumping is solved by the addition of "propylene polymer" and that the solution rate of mixtures of sodium carbonate with the above phosphates is thereby increased to a surprising degree.

Propylene polymer is an olefinic hydrocarbon mixture containing a major proportion of dodecene which has an average molecular weight of 185, a refractive index of 1.4380 at 25° C. and the following distillation range:

| | Degrees C. |
|---|---|
| 1st drop | 185 |
| 5% | 188 |
| 10% | 189 |
| 20% | 190 |
| 40% | 192 |
| 60% | 194 |
| 80% | 200 |
| 90% | 208 |
| End point | 224 |

The chemical composition of the water treating product may be varied widely to meet specific requirements, but for optimum results from the standpoint of detergent and water softening properties, it is preferred to maintain the components thereof within the limits specified in the following formulation.

| | Per cent by weight |
|---|---|
| Phosphate composition | 96 to 88 |
| Gas liberating alkalinity adjusting compound | 4 to 10 |
| Unsaturated aliphatic hydrocarbon compound | 0.02 to 2 |

Expressed in terms of pH, it is essential, when employing a gas liberating alkalinity adjusting agent, that the composition be so proportioned as to yield a pH in 1% solution of about 6.7 to about 8.0 and within this range a pH of 7.8 is preferred. However, if a gas liberating compound is included in the composition which does not depend upon a particular pH of solution to liberate a sufficient amount of gas to float the product, then pH is not a critical factor and therefore compositions having a pH outside of the above range may be employed. Thus, in its broadest aspect, the present invention is directed to water treating products having the following range of compositions.

| | Per cent by weight |
|---|---|
| Phosphate composition | 80 to 96 |
| Gas liberating compounds | 20 to 2 |
| Unsaturated aliphatic hydrocarbon | 0.02 to 2 |

"Phosphate composition" as used above covers water soluble molecularly dehydrated alkali metal phosphates having an alkali metal oxide/$P_2O_5$ molecular ratio of about 1.0 to about 1.3. Stated differently, this expression covers the above water soluble molecularly dehydrated alkali metal phosphates or mixtures thereof in any of the various forms shown in the graph (Fig. 8) on page 460 of the article by E. P. Partridge et al. which is reported in vol. 63 of the J. Amer. Chemical Society, 1941. The expression "Gas liberating compounds" includes alkalinity adjusting agents such as sodium percarbonate, sodium carbonate, sodium bicarbonate or other compounds or combinations of compounds which hydrolyze or react together in the presence of water to yield a substantially water insoluble gas.

The unsaturated hydrocarbon compounds employed in producing non-matting, rapidly dissolving water treating products of the above type are those containing from 6 to 12 carbon atoms per polar group or more particularly those containing from 6 to 12 carbons in the hydrocarbon radical for each double bond. Examples of compounds within the foregoing class which yield the most satisfactory products are octene and "propylene polymer."

The amount of unsaturated compound employed in the water treating product may fluctuate considerably, but it is preferably maintained within the range of about 0.02% to 2% by weight. The optimum amount varies with the compound selected, but in general the higher the molecular weight or the greater the number of carbon atoms per polar group, the smaller is the amount of the unsaturated compound required. In the case of "propylene polymer," the best results are obtained by using this material in an amount equivalent to about 1% by weight.

In compounding the above product, the components may be mixed together in any desired order so long as thorough and uniform mixing is obtained.

The particle size of the alkali metal phosphates is not critical, but it is desirable to use material not coarser than 50 mesh, and preferably not coarser than 100 mesh.

The above description has been limited to compositions consisting essentially of water soluble molecularly dehydrated alkali metal phosphates, gas-liberating compounds which yield a substantially water insoluble gas upon contact with water and an unsaturated aliphatic hydrocarbon compound of the class hereinbefore defined. The invention, however, is not restricted thereto as various alkalinity adjusting compounds in addition to those specifically mentioned may be incorporated in the above compositions. For example, caustic soda, sodium sulfate, sodium bisulfate, sodium bisulfite, sodium metasilicate, trisodium orthophosphates, sodium pyrophosphates, sodium polyphosphates having a $Na_2O/P_2O_5$ molecular ratio above 1.3, and mixtures of these, and also the corresponding potassium salts may be employed if desired.

Where the gas-liberating compound yields gas upon contact with water irrespective of the pH of the composition, the above alkaline salts may be used in any desired proportions, but this is not true where gas-liberating alkalinity adjusting agents are employed. Thus, if sodium percarbonate, sodium carbonate, sodium bicarbonate or equivalent salts are used, the quantity of the alkalinity adjusting compounds must be so proportioned as to provide a composition having a pH in 1% solution not exceeding about 8.0, otherwise matting will occur. The reason for this is that a pH above 8 either prevents the reaction between the phosphates and the alkalinity adjusting agent from occurring or it retards the reaction rate to a point where the gas is not liberated rapidly enough to float the product. The result is that the phosphate composition sinks to the bottom of the dissolving vat and forms a very slowly dissolving residue.

The present invention is limited solely by the claims attached hereto as part of the present specification.

I claim:

1. A substantially non-matting water treating composition consisting essentially of a substantially homogeneous mixture of the following materials in the indicated proportions: a water soluble molecularly dehydrated sodium phosphate having a sodium oxide/$P_2O_5$ molecular ratio of about 1.0 to about 1.3, 80%–96% by weight; a compound selected from the group consisting of sodium carbonate, sodium bicarbonate and sodium percarbonate, 20%–2% by weight; an unsaturated aliphatic hydrocarbon selected from the group consisting of "propylene polymer" and octene, 0.02%–2% by weight.

2. A substantially non-matting water treating composition consisting essentially of a substantially homogeneous mixture of the following materials in the indicated proportions: a water soluble molecularly dehydrated sodium phosphate having a sodium oxide/$P_2O_5$ molecular ratio of about 1.0 to about 1.3, 88%–96% by weight; a compound selected from the group consisting of sodium carbonate, sodium bicarbonate and sodium percarbonate, 4%–10% by weight; an unsaturated aliphatic hydrocarbon selected from the group consisting of "propylene polymer" and octene, 0.02%–2% by weight.

3. A substantially non-matting water treating composition in accordance with claim 2 wherein the water soluble molecularly dehydrated sodium phosphate is sodium hexametaphosphate.

4. A substantially non-matting water treating composition in accordance with claim 2 wherein the water soluble molecularly dehydrated sodium phosphate is sodium septaphosphate.

5. A substantially non-matting water treating composition consisting essentially of a substantially homogeneous mixture of the following materials in the indicated proportions: a water soluble molecularly dehydrated sodium phosphate having a sodium oxide/$P_2O_5$ molecular ratio of about 1.0 to about 1.3, 88%–96% by weight; a compound selected from the group consisting of sodium carbonate, sodium bicarbonate and sodium percarbonate, 4%–10% by weight; "propylene polymer," 0.02%–2% by weight.

6. A substantially non-matting water treating composition consisting essentially of a substantially homogeneous mixture of the following materials in the indicated proportions: a water soluble molecularly dehydrated sodium phosphate having a sodium oxide/$P_2O_5$ molecular ratio of about 1.0 to about 1.3, 88%–96% by weight; a compound selected from the group consisting of sodium carbonate, sodium bicarbonate and sodium percarbonate, 4%–10% by weight; octene, 0.02%–2% by weight.

7. A substantially non-matting water treating composition consisting essentially of a substantially homogeneous mixture of sodium hexametaphosphate, about 6% by weight of sodium carbonate and about 1% by weight of "propylene polymer."

8. A substantially non-matting water treating composition consisting essentially of a substantially homogeneous mixture of sodium septaphosphate, about 6% by weight of sodium carbonate and about 1% by weight of "propylene polymer."

JOHN W. LEFFORGE.

REFERENCES CITED

The following references are of record in the file of this patent:

UNITED STATES PATENTS

| Number | Name | Date |
|---|---|---|
| Re. 19,719 | Hall | Oct. 8, 1935 |
| 1,717,553 | Flammer et al. | June 18, 1929 |
| 1,979,925 | Zinn | Nov. 6, 1934 |
| 2,244,158 | Hubbard et al. | June 3, 1941 |
| 2,414,969 | Moose | Jan. 28, 1947 |

FOREIGN PATENTS

| Number | Country | Date |
|---|---|---|
| 528,964 | Great Britain | Nov. 12, 1940 |